United States Patent
Blair et al.

(10) Patent No.: US 7,653,543 B1
(45) Date of Patent: Jan. 26, 2010

(54) AUTOMATIC SIGNAL ADJUSTMENT BASED ON INTELLIGIBILITY

(75) Inventors: Colin Blair, Westleigh (AU); Jonathan R. Yee-Hang Choy, Wahroonga (AU); Andrew W. Lang, Epping (AU); David Preshan Thambiratnam, Ashfield (AU); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 596 days.

(21) Appl. No.: 11/388,694

(22) Filed: Mar. 24, 2006

(51) Int. Cl.
*G10L 21/00* (2006.01)
*G06F 17/20* (2006.01)

(52) U.S. Cl. ............ 704/270; 704/8; 704/224; 704/271

(58) Field of Classification Search .................. None
See application file for complete search history.

(56) References Cited

U.S. PATENT DOCUMENTS

| | | | |
|---|---|---|---|
| 4,468,804 A | 8/1984 | Kates et al. | |
| 4,696,039 A | 9/1987 | Doddington | |
| 4,852,170 A | 7/1989 | Bordeaux | |
| 5,018,200 A | 5/1991 | Ozawa | |
| 5,206,903 A | 4/1993 | Kohler et al. | |
| 5,583,969 A | 12/1996 | Yoshizumi et al. | |
| 5,634,086 A | 5/1997 | Rtischev et al. | |
| 5,644,680 A | 7/1997 | Bielby et al. | |
| 5,684,872 A | 11/1997 | Flockhart et al. | |
| 5,802,149 A | 9/1998 | Hanson | |
| 5,828,747 A | 10/1998 | Fisher et al. | |
| 5,905,793 A | 5/1999 | Flockhart et al. | |
| 5,982,873 A | 11/1999 | Flockhart et al. | |
| 6,064,731 A | 5/2000 | Flockhart et al. | |
| 6,084,954 A | 7/2000 | Harless et al. | |
| 6,088,441 A | 7/2000 | Flockhart et al. | |
| 6,122,614 A | 9/2000 | Kahn et al. | |
| 6,151,571 A | 11/2000 | Pertrushin | |
| 6,163,607 A | 12/2000 | Bogart et al. | |
| 6,173,053 B1 | 1/2001 | Bogart et al. | |
| 6,178,400 B1 * | 1/2001 | Eslambolchi | 704/234 |
| 6,192,122 B1 | 2/2001 | Flockhart et al. | |
| 6,243,680 B1 | 6/2001 | Gupta et al. | |
| 6,259,969 B1 | 7/2001 | Tackett et al. | |
| 6,275,806 B1 | 8/2001 | Pertrushin | |

(Continued)

FOREIGN PATENT DOCUMENTS

CA 1333425 12/1994

(Continued)

OTHER PUBLICATIONS

*An Introduction to Latent Semantic Analysis*, Landauer et al., *Discourse Processes*, 1998,41 pages.

(Continued)

*Primary Examiner*—Matthew J Sked
(74) *Attorney, Agent, or Firm*—Sheridan Ross P.C.

(57) ABSTRACT

The present invention is directed toward a method, device, and system for providing a high quality communication session. The system provides a way of determining speech characteristics of participants in the communication session and adjusting, if necessary, signals from a speaker to a listener such that the listener can more intelligibly understand what the speaker is saying.

30 Claims, 5 Drawing Sheets

U.S. PATENT DOCUMENTS

| | | | |
|---|---|---|---|
| 6,275,991 B1 | 8/2001 | Erlin | |
| 6,278,777 B1 | 8/2001 | Morley et al. | |
| 6,292,550 B1 | 9/2001 | Burritt | |
| 6,314,165 B1 | 11/2001 | Junqua et al. | |
| 6,353,810 B1 | 3/2002 | Petrushin | |
| 6,363,346 B1 | 3/2002 | Walters | |
| 6,374,221 B1 | 4/2002 | Haimi-Cohen | |
| 6,389,132 B1 | 5/2002 | Price | |
| 6,408,273 B1* | 6/2002 | Quagliaro et al. | 704/271 |
| 6,427,137 B2 | 7/2002 | Petrushin | |
| 6,463,415 B2 | 10/2002 | St. John | |
| 6,480,826 B2 | 11/2002 | Pertrushin | |
| 6,643,622 B2 | 11/2003 | Stuart et al. | |
| 6,697,457 B2 | 2/2004 | Petrushin | |
| 6,766,014 B2 | 7/2004 | Flockhart et al. | |
| 6,801,888 B2 | 10/2004 | Hejna et al. | |
| 6,839,669 B1 | 1/2005 | Gould et al. | |
| 6,847,714 B2* | 1/2005 | Das et al. | 379/265.12 |
| 6,889,186 B1 | 5/2005 | Michaelis | |
| 6,940,951 B2 | 9/2005 | Mahoney | |
| 6,999,563 B1 | 2/2006 | Thorpe et al. | |
| 7,065,485 B1 | 6/2006 | Chong-White et al. | |
| 7,180,997 B2* | 2/2007 | Knappe | 379/387.01 |
| 7,222,074 B2 | 5/2007 | Zhou | |
| 7,222,075 B2 | 5/2007 | Petrushin | |
| 7,267,652 B2 | 9/2007 | Coyle et al. | |
| 2002/0095292 A1* | 7/2002 | Mittal et al. | 704/270 |
| 2003/0191639 A1 | 10/2003 | Mazza | |
| 2004/0148161 A1* | 7/2004 | Das et al. | 704/224 |
| 2004/0215453 A1 | 10/2004 | Orbach | |
| 2005/0065789 A1 | 3/2005 | Yacoub et al. | |
| 2005/0094822 A1* | 5/2005 | Swartz | 381/56 |
| 2006/0036437 A1 | 2/2006 | Bushey et al. | |
| 2006/0252376 A1* | 11/2006 | Fok et al. | 455/67.13 |
| 2007/0038455 A1* | 2/2007 | Murzina et al. | 704/263 |

FOREIGN PATENT DOCUMENTS

| | | |
|---|---|---|
| EP | 0076687 | 4/1983 |
| EP | 0140249 | 5/1985 |
| EP | 0360265 | 3/1990 |
| JP | 10-124089 | 5/1998 |
| WO | 00/22611 | 4/2000 |
| WO | 2004/056086 | 7/2004 |

OTHER PUBLICATIONS

*Speech Digitization and Compression*, Michaelis, In W. Warkowski (Ed.), *International Encyclopedia of Ergonomics and Human Factors*. London: Taylor Francis, 2001, 683-686.
*Phoneme-less Hierarchical Accent Classification*, Lin et al., HP Laboratories Palo Alto, Oct. 4, 2004, 5 pages.
U.S. Appl. No. 10/756,669, filed Jan. 12, 2004, Thambiratnam.
U.S. Appl. No. 11/131,108, filed May 16, 2005, Michaelis.
U.S. Appl. No. 11/508,442, filed Aug. 22, 2006, Coughlan.
U.S. Appl. No. 11/508,477, filed Aug. 22, 2006, Michaelis.
U.S. Appl. No. 11/768,567, filed Jun. 26, 2007, Coughlan.
U.S. Appl. No. 10/882,975, filed Jun. 30, 2004, Becker et al.
"Assistive Writing," AbilityHub.com (printed Apr. 11, 2005), available at http://www.abilityhub.com/speech/speech-Id.htm, 2 pages.
"Automatic Speech Recognition," Technology Access Program, AbilityHub.com (Fall 2002), available at http://tap.gallaudet.edu/SpeechRecog.htm, 2 pages.
"Contrasts in Pronunciation," (undated), available at http://www.bohemica.com/czechonline/reference/pronunciation/contrasts.htm, 2 pages.
"Inside Speech Recognition," (printed Apr. 11, 2005) available at http://fsug.org/usyd.edu.au/documentation/HOWTO/Speech-Recognition-HOWTO/inside...., 2 pages.
"Speech Recognition," (printed Apr. 11, 2005) available at http://murray.newcastle.edu.au/user/staff/speech/home_pages/tutorial_sr.html, 5 pages.
Agile Lie Detector; Available at: http://www.agilemobile.com/agile_liedetector.html; 2004; 1 page; Agilemobile.com.
Arslan, Levent M., "Foreign Accent Classification in American English," thesis, pp. 1-200, Department of Electrical Computer Engineering, Duke University, 1996.
Arslan, Levent M., et al., "Language Accent Classification in American English," Robust Speech Processing Laboratory Department of Electrical Engineering, Durham, North Carolina, Technical Report RSPL-96-7(1996).
Aviation Safety Investigation Report; Available at: http://64.233.167.104/search?q=cache:xL7YYq5EvwsJ:www.atsb.gov.au/aviation/pdf/200204328. pdf+%22speech+analysis%22+%22detect%22+and+%22state+of+intoxication%22&hl=en&gl=us&ct=clnk&cd=1; Undated; 151 pages; Australian Transport Safety Bureau.
De-FIB-ulator Portable Lie Detector; Available at: http://www.sharperimage.com/us/en/catalog/product/sku_AR002; 2006; 2 pages; The Sharper Image.
Dialing Under The Influence; Available at: http://www.virginmobile.com.au/services/duti.html; 2006; 2 pages; Virgin Mobile.
Hansen, John H.L., et al., "Foreign Accent Classification Using Source Generator Based Prosodic Features," IEEE Proc. ICASSP, vol. 1, Detroit U.S.A., (1995), pp. 836-839.
Hollien H.; "Production of intoxication states by actors—acoustic and temporal characteristics."; J. Forensic Sci.; Jan. 2001; 46(1); pages 68-73; Two-page internet summary available at http://www.ncbi.nlm.nih.gov/entrez/query.fcgi?db=pubmed&cmd=Retrieve&dopt=Abstract&list_uids=11210927&query_hl=3&itool=pubmed_ExternalLink.
Hosom, John-Paul, et al., "Training Neural Networks for Speech Recognition," Center for Spoken Language Understanding, Oregon Graduate Institute of Science and Technology (Feb. 2, 1999), 51 pages.
Jackson, Philip J.B., et al., "Aero-Acoustic Modeling of Voiced and Unvoiced Fricatives Based on MRI Data," University of Birmingham and University of Southampton, (undated), 4 pages.
Johnson K.; "Do voice recordings reveal whether a person is intoxicated? A case study."; Phonetica; 1990; 47(3-4); pp. 215-237; One-page internet summary available at http://www.ncbi.nlm.nih.gov/entrez/query.fcgi?db=pubmed&cmd=Retrieve&dopt=Abstract&list_uids=2130381&query_hl=5&itool=pubmed_ExternalLink.
Kirriemuri, John, "Speech Recognition Technologies," TSW 03-03 (Mar. 2003), 13 pages.
Lamel, L.F., et al., "Language Identification Using Phone-based Acoustic Likelihoods," ICASSP-94.
Laramee, François Dominic, "Speech Interfaces for Games—Part 1: How Speech Recognition Words," GIGnews.com (2000), available at http://www.gignews.com/fdlspeech2.htm, 5 pages.
Lie Detection And A Major Breakthrough In Price And Portability!; Available at: http://www.pimall.com/nais/e.pse.html; 2006; Thomas Investigative Publications, Inc.; Austin, TX.
Loizou, Philip, "Speech Production and Perception," EE 6362 Lecture Notes (Fall 2000), pp. 1-30.
Markowitz, J., "Glossaries," available at http://www.jmarkowitz.com/glossary.html, 4 pages.
Module 3; Available at: http://www.dendrites.com/mod3r.html; Undated; 244 pages.
Module 4, Autonomic Nervous System: Clinical Implications and Non Pharmaceutical Applications.; Available at: http://www.dendrites.com/module4.htm; Undated; 39 pages.
Noth, E., et al., "Research Issues for the Next Generation Spoken"; University of Erlangen-Nuremberg, Bavarian Research Centre for Knowledge-Based Systems, at http://www5.informatik.uni-erlangen.de/literature/psdir/1999/Noeth99:RIF.ps.gz, downloaded Feb. 10, 2003.
Pervasive, Human-Centered Computing, MIT Project Oxygen, MIT Laboratory for Computer Science, Jun. 2000.
Pisoni DB.; "Effects of alcohol on the acoustic-phonetic properties of speech: perceptual and acoustic analyses."; Alcohol Clin Exp Res.; Aug 1989; 13(4); pp. 577-587; One-page internet summary available at http://www.ncbi.nlm.nih.gov/entrez/query.fcgi?db= pubmed&cmd=Retrieve&dopt=Abstract&list_uids=2679214&query_hl=7&itool=pubmed_ExternalLink.

Zue, Victor, "The MIT Oxygen Project," MIT Laboratory for Computer Science, Apr. 25-26, 2000.

Watson Pi, Ciccia AH, Weismer G (2003), The relation of lung volume initiation to selected acoustic properties of speech. J Acoust Soc Am 113 :2812-2819.

Novak, D Cuesta-Frau, and L. Lhotska: Speech recognition methods applied to biomedical signals processing. Engineering in Medicine and Biology Society. 2004; 1: 118-121.

Entwistle, The performance of automated speech recognition systems under adverse conditions of human exertion. Int. J. Hum.-Comput. Interact. 16 (2003) (2), pp. 127-140.

Entwistle, "Training Methods and Enrollment Techniques to Improve the Performance of Automated Speech Recognition Systems Under Conditions of Human Exertion", A Dissertation Submitted in Partial Fulfillment of The Requirements for the Degree of Doctor of Philosophy, University of South Dakota, Jul. 2005.

Background of the Invention for the above-captioned application (previously provided).

* cited by examiner

| | 204 | 208 | 212 | 200 ↙ 216 |
|---|---|---|---|---|
| | PARTICIPANT | ROLE | ACCENT GROUP | ADJUSTMENT PARAMETERS |
| | 1 | SPEAKER | 3 | — |
| | 2 | LISTENER | 4 | d(3,4):SPEED↓, VOLUME↑, PITCH↑ |
| | 3 | LISTENER | 7 | d(3,7):SPEED —, VOLUME↓, PITCH↑ |
| | ⋮ | ⋮ | ⋮ | ⋮ |
| | n | LISTENER | K | d(3,k):SPEED↑, VOLUME↓, PITCH↑ |

US 7,653,543 B1

AUTOMATIC SIGNAL ADJUSTMENT BASED ON INTELLIGIBILITY

FIELD

The invention relates generally to the field of speech, audio, and audio-visual signal processing. More specifically, the present invention provides a way to enhance intelligibility for a recipient of a given signal.

BACKGROUND

When playing back recorded speech or video signals, it is often desirable to speed up the playback for efficiency. However, not all messages can be sped up to the same degree while retaining intelligibility. Controls for speeding up the playback are generally set manually, and must be adjusted for each message. Also, sometimes a listener of the message needs to slow down the message in order to understand part or all of its contents. This typically occurs when the speaker has an accent as perceived by the listener, or when listeners require additional time to understand the concepts being presented. If the message is to be played back to a number of listeners, it is highly unlikely that each listener will want or need to speed up or slow down the playback speed of the original recording by the same amount. For example, if a speaker who is from India records a message, a listener from China may not be able to intelligibly understand everything the speaker says at the same speed as a listener from Spain would be able to. Each listener is typically required to manually set the playback speed according to his/her preferences and comprehension rate. The listener from China may manually set the recording to a first playback speed in order to intelligibly understand the contents of the message. Conversely, the listener from Spain may manually set the recording to a second different playback speed in order to intelligibly understand the message.

Often two individuals from different regions of the world attempting to communicate each party perceive the other party to have an accent. Sometimes the perceived accent does not substantially affect the communication between the two parties. However, if the accents do affect the communication between the two parties, it is usually because one party or both parties cannot intelligibly understand what the other party is saying due to his or her perceived accent. This may result in awkward or annoying situations where one participant is continually asking the other participant to slow down when he or she speaks or repeat something that has already been said. On the other hand, one party may be too embarrassed to ask the other party to repeat themselves even when the listening party did not understand everything the speaker said. The listener may never fully understand what the speaker is saying. This outcome could be especially problematic if the speaker was a superior of the listener and the listener was given an order. If the listener was not able to fully comprehend what the order was, and does not ask for the speaker to repeat him/herself, the order may go uncompleted.

A mechanism used to slow down recorded audio signals in order to increase intelligibility is known as Time-Scale Modification (TSM). In typical TSM applications, a listener can manually control the speaking rate during playback of a previously recorded message. This enables the listener to speed up or slow down the articulation rate and, thereby, the information delivery rate provided by the previously recorded message. As is well known to those of ordinary skill in the art, the use of the TSM method enables the sped up or slowed down audio signal to be presented intelligibly at the corresponding increased or decreased playback rate. Thus, for example, a listener can readily comprehend material through which he/she is fast-forwarding.

In typical TSM systems, input from the listener is usually required through the use of key presses, mouse movements, or similar commands in order to specify playback speed. These commands enable a listener to manually adjust the information delivery rate of an audio signal to suit his/her interests and speed of comprehension needs.

A draw back to current TSM systems is that a manual input from a listener is required. As the listener is trying to understand what the speaker is saying, the listener must also concentrate on adjusting speed controls and giving commands to control the playback rate. Furthermore, these TSM systems are typically not used in real-time conversations. Rather, the TSM systems are usually used when a listener is actually listening to a pre-recorded message. Also, as the listener is concentrating on adjusting the speed of the recording, he or she may potentially miss important information.

There have been some attempts to correct these shortcomings, however many of them are incomplete or still leave something to be desired. For example, some systems can monitor the listener's manual input to the playback speed controls. As playback speed is manually adjusted the system "learns" what sort of content the listener is interested in. Based on what the monitoring unit believes the listener is interested in, it will attempt to identify similar content in subsequent parts of the message and will slow them down or speed them up according to how that particular content was treated before. Unfortunately, this particular solution still requires a listener to manually speed up or slow down the message a number of times before the monitoring unit is able to "learn" how content should be treated in the future. Therefore, the monitoring unit is usually only able to make determinations about what portions of the message should be sped up and slowed down only after the user has supplied some substantial amount of manual feedback. If a listener is struggling to comprehend a particular message or portion of a message but does not try to manually speed up or slow down that portion of the message, the monitoring unit will have a difficult time identifying content that should be sped up or slowed down in the future.

Another problem that has been encountered in the prior art is that accommodations that are available to telecommunication device users with cognitive disabilities or shortcomings are somewhat limited. The Federal government has attempted to regulate telecommunication providers and systems by requiring them to accommodate people with limited cognitive skills. Specifically, the Code of Federal Regulations states that telecommunication system providers should, "Provide at least one mode that minimizes the cognitive, memory, language, and learning skills required of the user." (36 CFR 1193.41(i)). In order to comply with this provision, many techniques and systems have been explored by telecommunication providers. One strategy that has been employed to assist users with limited cognitive skills is that a user is provided with an "undo" or backup function. The backup function provided to a user allows them to easily correct any mistake that he/she makes during the course of using the telecommunication device/system. More specifically, many times when a customer calls into a contact center an Interactive Voice Response (IVR) unit will prompt the customer to answer various questions. Many times the customer is able to engage a backup key that undoes the last answer entered by the customer. Another technique that is employed by many systems is a menu that repeats itself on a constant basis. This way, if the customer cannot comprehend an entire message the first time it is played to the customer, he/she can wait until the message is replayed in order to understand more of the message.

Unfortunately, the above-noted solutions still leave something to be desired. Certainly it can still become frustrating to a user when he/she must continually hit the backup button every time they make a mistake. It could take a much longer time to complete a task involving an IVR or other prerecorded message if the user has to keep cycling through choices because he/she selected the wrong choice. It can be equally frustrating for a user to listen to the same message four, five, or even six times in order to understand the entire message. Therefore, the systems that are currently in place for users with cognitive disabilities still leave much to be desired.

SUMMARY

The present invention is directed towards methods, systems, and devices for enhancing a communication session between at least two participants. Specifically, embodiments of the present invention provide automated mechanisms that adjust the playback of speech in a manner that improves the listener's comprehension when it is determined that a mismatch exists between the original speech signal and the listener's preferred style of speech. Examples of stylistic mismatches include accent differences between speaker and listener, and the rate with which concepts are presented by the speaker.

In one embodiment, a method is provided for increasing the intelligibility of a communication session between a first participant and a second participant. The method comprising:

receiving a signal from the first participant;

determining at least one speech style characteristic of the first participant;

determining at least one listening style characteristic of the second participant;

determining a difference between each of the first and second participant's determined characteristic(s); and based on the determined difference, performing one or more of the following:

(i) adjusting at least one property of at least one portion of the signal and transmitting the adjusted signal to the second participant; and/or (ii) maintaining original properties of at least a portion of the signal and transmitting the signal to the second participant.

As used herein, "speech style characteristics", "listening style characteristics" can be used to refer to any abnormal variance in a signal as perceived by another. Generally, the speech style characteristic may define an "accent characteristic", "accent type", and/or a "content delivery characteristic" of a speaker. The listening style characteristic may define a listener's preference for receiving a signal. Typically, a listener's preference is somewhat related to his/her speech style characteristics. However, a listener's listening style characteristics do not necessarily need to be the same as his/her speech style characteristics. Examples of a speech/listening style characteristic include, but are not limited to, pitch, volume, timbre, tone, speech rate, content delivery rate, and content complexity. Additionally, the amount of energy delivered by a signal may also be considered an speech/listening style characteristic. As an example, accent characteristics may be determined by measuring a change in phonemes or by measuring a rate of phonemes for a given signal. As can be appreciated by one of skill in the art, speech/listening style characteristics are not confined to spoken sound. Speech/listening style characteristics may also apply to actions or other queues received through sight rather than sound.

Speech rate is basically how fast a particular speaker is speaking. For example, a typical Canadian tends to speak slower than the average American. This is mainly a product of the different regions in which each person was raised.

Content delivery rate on the other hand is the amount of content delivered over a given time interval. Typically, a higher speech rate correlates to a higher content delivery rate. However, this is not always the case. Content delivery rate may be measured by the number of bits of information delivered over a given time interval. Just because someone is speaking quickly does not mean they are delivering useful content or information. They may simply be mumbling or making other useless noises. Likewise, content delivery rate can correspond to the complexity of the content that is being delivered per unit time.

One of the many advantages offered by embodiments of the present invention is that if a first participant is from a particular region (e.g., Ireland) and a second participant is from another region (e.g., Italy), the signals transmitted by each participant will be processed according to the accent of the intended recipient of the signal. The processing of the signal affords the recipient to more intelligibly, and efficiently, understand the contents of the message than if they were receiving the raw message transmitted by the sending participant.

In accordance with at least some embodiments of the present invention, the speech/listening style characteristics of each participant are determined automatically and a transmitted signal is then processed automatically before it is delivered to the recipient. This allows each participant to focus on the conversation rather than trying to adjust various properties of the signal such that they can more easily understand what the other participant is saying. Of course, there may be a manual input provided such that each participant can fine-tune the adjustment parameters of the signal, but the use of such an input is hopefully minimized.

In accordance with further embodiments of the present invention, participants are assigned to predefined accent groups. By having accent groups predefined by the system, accent characteristics of each participant can be determined, sometimes within a certain tolerance, and the participant can be assigned to an accent group. Once participants are assigned to an accent group the calculation of the differences between each participant's respective accent characteristics becomes easier because the differences between all accent groups may be calculated prior to a communication session beginning. This may result in less required processing during the communication session, which in turn may decrease the amount of delay between signal transmission and signal reception.

Accent groups may be divided up by various amounts of granularity. For example, only two accent groups may exist, and each participant is assigned to one or the other. This way quick calculations and signal processing can be performed. However, if there exist only two accent groups, then there is a greater probability that the signal may not be processed very accurately before it is transmitted on to the intended recipient. On the other hand, hundreds of accent groups can be defined and this can possibly result in a more accurate assignment of a participant to an accent group that actually represents his/her accent characteristics. Furthermore, there may be an "accent group" for each participant or potential participant. These participants may be subscribers to the system and may have already had their accent characteristics determined.

Then, when the participant engages in a subsequent communication session, the participant can be identified and his/her accent characteristics can be referenced from a database. The identification of communication session participants provides for the most accurate determination and representation of accent characteristics but of course the amount of processing power and system maintenance is increased. The amount of granularity used to define accent groups can be left up to the discretion of a system administrator.

In accordance with still further embodiments of the present invention, the determination of accent characteristics is performed up to a particular point. The communication session can be monitored (e.g., accent characteristics of each participant and the differences therebetween can be determined) up to a particular monitoring threshold. The monitoring threshold can correspond to a predetermined amount of time that monitoring should take place or a predetermined amount of accuracy with which a participant's accent characteristics are determined. If the predetermined amount of time has expired, then the monitoring of the communication session can be terminated and the required adjustments, if any, of each participant's transmitted signals can be set. If the monitoring threshold is a required accuracy with which a participant's accent characteristics need to be determined, the communication session will only be monitored until the required accuracy level is met. Thereafter, the monitoring of the session can be terminated. This way excess processing power is not used in an effort to try and further define a participant's accent characteristics if they have already been determined within a required tolerance.

In accordance with yet another embodiment of the present invention, a speaker may be identified not only by his/her accent characteristics, but a speaker can be identified according to information contained within a header or envelope of a call. When a participant is sending a call to another person, the identity of the sending participant is typically-contained within the header of the call as caller identification information. Call location is another type of information that can be sent as a part of the call header. Both the call location and caller identification information can easily be analyzed in order to make a quick determination of the speaker/listener's accent characteristics. Of course, the first determination of accent characteristics based on location information may be a relatively approximate determination. But, when caller identification information is used, the first determination may provide an accurate representation of the participant's accent characteristics.

The receiving endpoint is able to process this identification information and compare the identity of the sending participant with the identity of the receiving participant and automatically adjust parameters of the signal sent to the receiving participant such that contents of the message can be understood more intelligibly and/or with greater efficiency than if the message was played in its original form. For example, when a person in a slower speaking region receives a call from a person in faster speaking region, the receiving party may wish to slow down the message in order to understand the contents of the message more easily. A processor may be employed to determine that the sending party is from the faster speaking region and the receiving party is in slower speaking region, and the contents of the message should be slowed down so that the relatively slower speaking participant can understand the message. Alternatively, when the slower speaking participant is speaking to the faster speaking participant, a processor may be used to speed up the contents of the message transmitted by the slower speaker so that the other participant can hear the contents of the message with greater efficiency. This particular process may be useful in both real-time communications and recorded communications.

In accordance with another embodiment of the present invention, a communication method is provided in an interaction between at least a first and second communication device that has a corresponding participant, comprising:

receiving a voice signal from the first communication device;

adjusting at least one property of at least a portion of the signal to compensate for a listening style characteristic of the second participant; and thereafter providing the adjusted signal to the second participant.

When a participant is identified as having cognitive disabilities, the signal that is transmitted to the participant may be slowed down if doing so would help the participant understand the contents of the message during the first transmission of the message. This allows a listener with cognitive disabilities to listen to one message at a preferred speed, such that he/she can understand the message without replaying the message. The user may then be able to respond to the message more accurately than if the message was repeated a number of times. The manner in which the signal is adjusted may be customized for a participant depending upon his/her level of cognitive disabilities. For example, a first participant may only need a message slowed down very slightly in order to understand the full contents of the message. Conversely, a second participant may need a message slowed down a great deal in order to compensate for his/her cognitive disabilities. Furthermore, the length of the message, the amount of content provided by the message, the complexity of the content provided by the message, and the rate of content delivery may also be a determining factor for signal adjustment.

With regard to accommodation of people with cognitive disabilities, it is important to note that the factors influencing their ability to comprehend speech often go beyond the number of words or phonemes per unit time. An additional factor influencing their ability to comprehend speech is the number and complexity of concepts presented per unit time. Techniques known within the prior art, commonly identified in the scientific literature as Semantic Analysis, are able to identify the individual concepts within a corpus of text or speech, and are also able to classify the complexity of those concepts. Embodiments of the present invention rely on these techniques as a basis for adjusting the playback rate of the speech, not just with regard to number of words or phonemes per unit time, but also concepts per unit time.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server and/or database, the invention is not limited to use with any particular type of communication system or configuration of system elements. Those skilled in the art will recognize that the disclosed techniques may be used in any communication application in which it is desirable to increase intelligibility as perceived by a recipient of a given signal.

Figure 1:
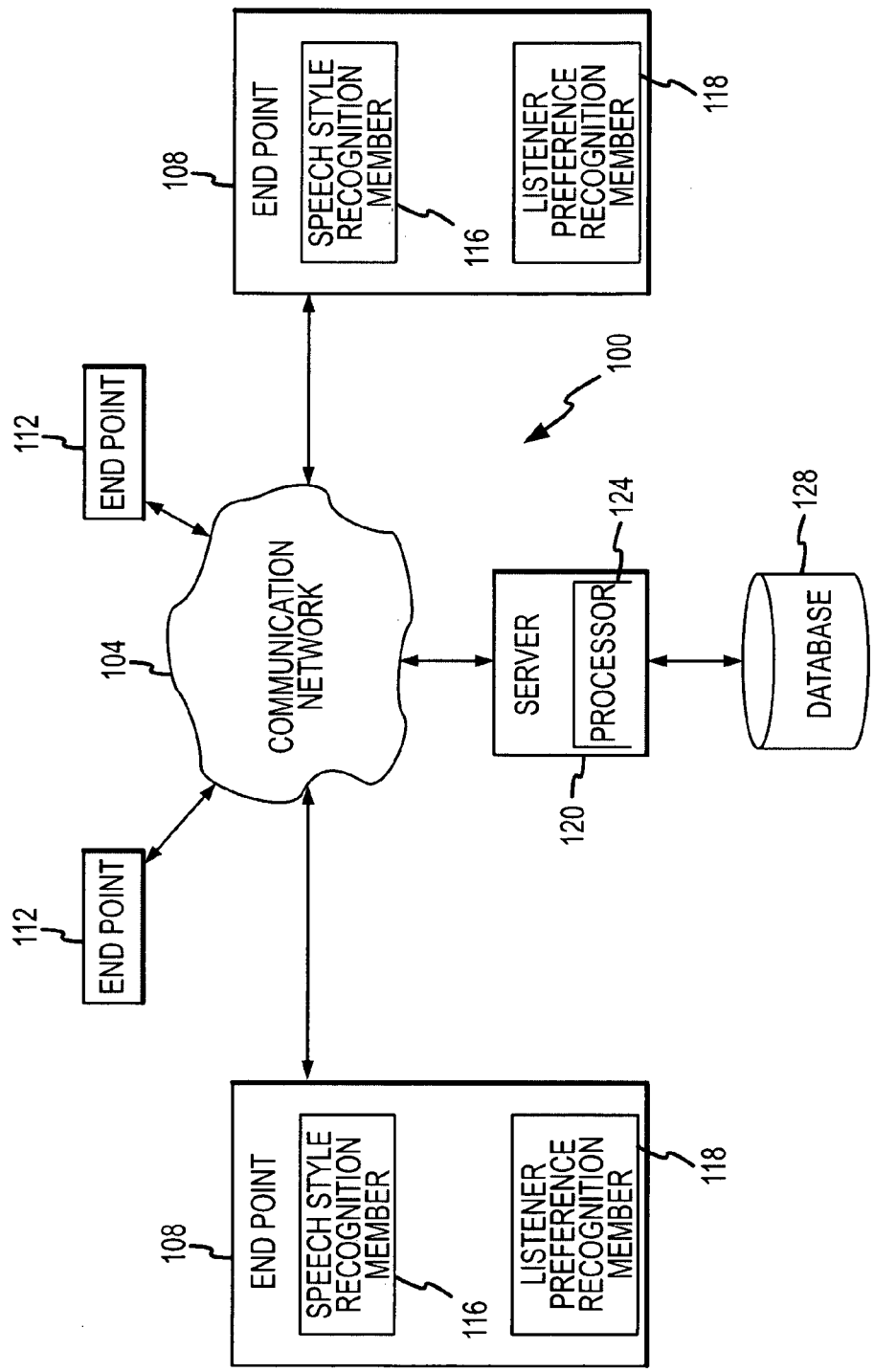
FIG. 1 is a block diagram depicting a communication network in accordance with embodiments of the present invention.

Referring initially to FIG. 1, an exemplary communication system 100 will be described in accordance with embodiments of the present invention. The communication system 100 generally comprises a communication network 104, which may be implemented in the form of a packet switched and/or circuit switched network, a first type of endpoint or telecommunication device 108, and a second type of endpoint or telecommunication device 112. The first type(s) of endpoints 108 comprise a speech style recognition member 116 and a listener preference recognition member 118, which are referred to herein collectively as recognition members. The second types of endpoints 112 are not equipped with an accent recognition member 116. The communication system 100 further comprises a server 120 that includes a processor 124, and a database 128.

A packet-switched version of the communication network 104 can be any data and/or distributed processing network, such as the Internet or an enterprise network. The network 104 (in the packet-switched configuration) typically includes proxies, registrars, and routers for managing packet flows.

Alternatively, a circuit-switched version of the communication network 104 may be in the form of a Publicly Switched Telephone Network (PSTN) or similar type of circuit-switched network.

The first and second types of endpoints 108 and 112 may be packet-switch enabled and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and IVRs, and packet-based traditional computer telephony adjuncts.

Alternatively, the endpoints 108 and 112 may have circuit-switching interfaces. Circuit-switched enabled endpoints 108 and 112 may be implemented in the form of, for example, wired and wireless telephones, PDAs, H.320 videophones and conferencing units, voice messaging and response units, and traditional computer telephony adjuncts.

In addition to the devices noted above, the endpoints 108 and 112 can include other types of communication devices. For example, personal computers, laptops, video cameras, digital cameras, and the like may all be considered endpoints.

The server 120 may be a part of an enterprise network. The term "server" as used herein should be understood to include a PBX, an ACD, an enterprise server, an IVR server, or other type of communications system server, as well as other types of processor-based communication control devices such as media servers, computers, adjuncts, etc.

The server 120 comprises a processor 124 as noted above. The processor 124 is operable to receive signals and/or commands from the communication network and implement various functions based on those received signals. Additionally, the processor 124 may reference certain routines that are stored in database 128. The processor 124 may be implemented as an Application Specific Integrated Circuit (ASIC), a micro-processor, or other type of processing unit known in the art.

The database 128 may be implemented separate from the server 120 as shown in FIG. 1, and/or may be employed as memory within the server 120. The database 128 is operable to store information related to participants within a given communication system 100, information related to accent groups or functions used to determine accent groups, functions for use by the processor 124, and other pertinent information.

In operation, at least two user's endpoints are connected through the communication network 104. Usually, at a given point during the communication session between the users, one user is speaking or sending a message and the other user is listening or receiving that message. An advantage offered by telephones and other communication devices is that people can communicate with one another over great distances. Because of this, generally, the speaker and the listener are not necessarily from the same region of the world. For example, the speaker may be from South Boston and the listener may be from Los Angeles. Because of this each participant may perceive the other participant to have an accent or otherwise have difficulty in intelligibly understanding what the other participant is saying. As such, whenever one participant is speaking, the other may have to exert some effort in an attempt to understand the speaker because they are not used to listening to someone from that particular region. As the communication session continues, each participant may assume the role of either the listener or the speaker. Sometimes, in the case of broadcasts or large conference calls, some participants are always listeners and others are always a speaker.

As the speaker utters the signal, it travels from his/her respective endpoint to the communication network 104, where it may be appropriately routed to the server 120. That signal is then transmitted to the listener's endpoint for him/her to receive the signal. Before the signal is transmitted to the listener, however, properties of the signal (e.g., the speed of transmission of the signal, volume of the signal, pitch of the signal, tone of the signal, etc.) may be altered. Typically the originally transmitted signal is altered because the listener would otherwise have difficulty in understanding the originally transmitted signal or because the listener would be able to easily understand the original signal and thus would like to hear it at an accelerated rate.

Usually the speech style recognition member 116, listener preference recognition member 118, and/or the processor 124 alter the signal prior to transmitting it to the listener to hear.

The recognition members 116 and/or 118 comprise a function or multiple functions that allow them to substantially determine a speech style characteristic or a set of characteristics of the speaker, substantially determine a listening style characteristic or: set: of characteristics of the listener, and substantially determine a difference between selected members of the characteristics of the speaker and the listener. Examples of accent characteristics include, but are not limited to, pitch, volume, timbre, tone, speech rate (e.g., how fast the speaker is talking), content rate (e.g., how much actual content is produced within a certain amount of time), content complexity, and the like. By monitoring at least a portion of these characteristics, the recognition member(s) 116 and/or 118 may be able to make a fairly accurate determination of the speaker's accent. Then based upon that determined difference, the recognition member(s) 116 and/or 118 alter properties of the signal. The properties of the signal that may be altered include, but are not limited to, pitch, tone, volume, and playback rate.

In U.S. Pat. No. 6,889,186 to Michaelis, which is herein incorporated by this reference in its entirety, a system is described for processing speech signals in order to improve the signal's intelligibility. The system first divides a speech signal into frames. Thereafter, the spectral content of each frame is analyzed in order to determine a sound type associated with that frame. The analysis of each frame may be performed in the context of one or more other frames that are surrounding a frame of interest. Based on the analysis of the frames, each frame may be adjusted individually so as to enhance the intelligibility of the signal when the receiving party receives the message. Additionally, in most analog signal systems it is not possible to adjust the speed of a particular signal without adjusting the pitch (frequency) of that signal. However, if a speech signal is divided into individual frames, i.e. is digitized, a signal may be played back at a slower speed without adjusting the pitch of the replayed signal. The playback rate can be slowed down by increasing the amount of time between replayed frames (e.g. by holding each frame of the digitized signal in a buffer for a small amount of time thereby extending the amount of time between frames). Likewise, the amount of time between replayed frames can be increased so as to increase the playback speed, without increasing the pitch of the replayed signal. However, if it is desired to adjust the pitch, or other spectral contents of the signal, the speed of the analog version of the signal may be adjusted first. Thereafter, the adjusted analog signal can be digitized and the speed of the played back digital signal can be adjusted. This means that the pitch will maintain its adjusted value. The playback speed of the signal can be adjusted back to the original playback speed, left at the adjusted speed, or further adjusted to another different playback speed.

As can be appreciated by one of skill in the art, the recognition member(s) 116 and/or 118 may perform a subset of these steps and allow an accent recognition member in the server 120 to perform another subset of the steps. Alternatively, an accent recognition member in the server 120 performs all of these steps. For example, the speech style recognition member 116 associated with the speaker's endpoint 108 may attempt to make a determination of just that speaker's accent characteristics. The speech style recognition member 116 may forward this information on to the server 120 to either be stored in the database 128, typically in association with an identifier of the corresponding speaker (whether a subscriber or a non-subscriber) or used immediately by the processor 124.

Meanwhile, the listener preference recognition member 118 associated with the listener's endpoint may have previously been monitoring portions of the listener's accent characteristics in this and/or prior conversations. This listener preference recognition member 118 may forward this information on to the server 120 to be used compared to selected ones of the speaker's accent characteristics. The processor 124 may make a determination of the differences between the listener and speaker's respective accents, if any, and adjust the signal transmitted from the speaker's endpoint such that the listener can intelligibly understand the content of the original signal. Of course, as can further be appreciated by one of skill in the art, the server 120 may comprise all of the necessary components and functions to perform all of the above noted actions. During a real-time discussion these actions may be performed such that the altered signal is immediately sent on to the listener's endpoint.

In one configuration, a sequence of selected speech tests are performed by subscribers to characterize and/or quantify each subscriber's respective accent characteristics. In this configuration, the previously obtained characteristics are used in preference to characteristics determined during the selected contact. This way during a given communication session where many participants are subscribers to the system, excessive processing does not need to be performed to determine each participant's set of accent characteristics. Rather, accent characteristics of many participants are already known and can be used directly by the system.

The message transmitted by the speaker may also be recorded for future reception by the listener. Typically, the message is stored on the database 128 with pointers to the calling parties respective accent characteristics, although it may be stored in memory of the receiving party's endpoint 108. Then, when the receiving party is ready to listen to the message, the properties of the message may be altered in order to allow the listener to intelligibly understand the message. In the event that accent information is available relating to the future listener of the message prior to the listener receiving the message, properties of the message may be altered and the altered message may be saved for future playback to the listener.

It should be emphasized that the configuration of the switch, server, user telecommunication devices, and other elements as shown in FIG. 1 is for purposes of illustration only and should not be construed as limiting the invention to any particular arrangement of elements.

Figures 2, 3:
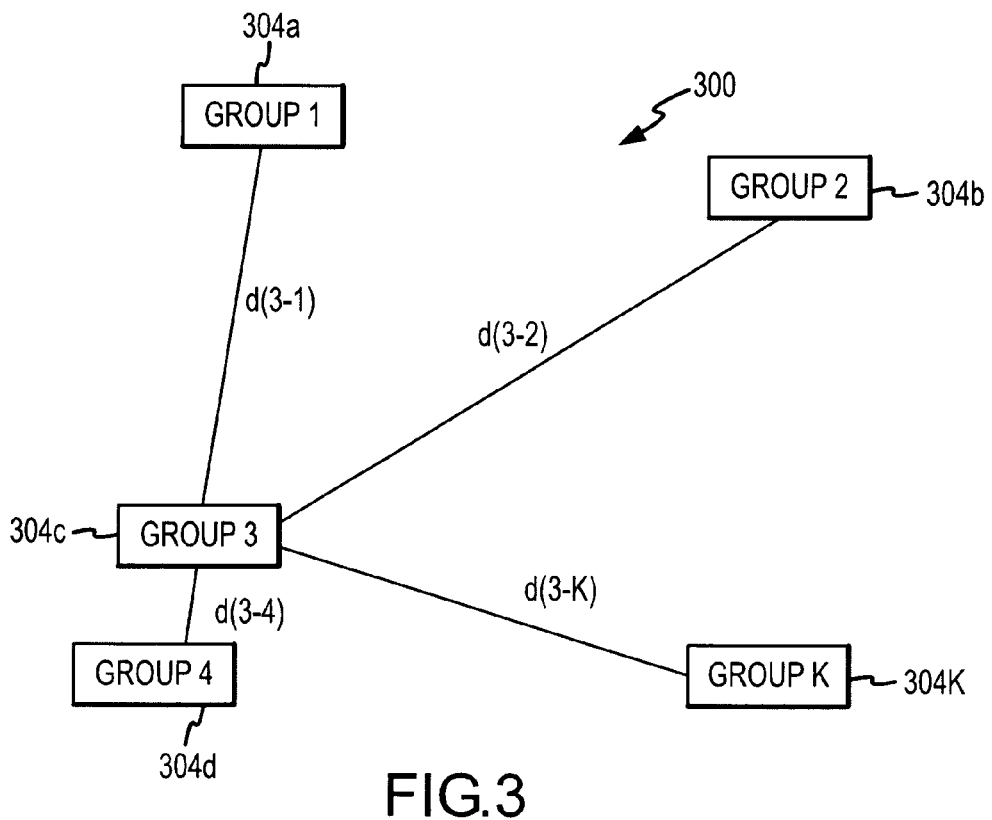
FIG. 2 is a block diagram depicting a data structure employed in accordance with embodiments of the present invention.
FIG. 3 is a representation of accent group positions and the use of such positions in accordance with embodiments of the present invention.

Referring now to FIG. 2 a data structure 200 used to maintain participant accent data will be described in accordance with at least some embodiments of the present invention. The data structure 200 may be maintained in the server 120, the database 128, and/or one or more of the participant's endpoints 108 and 112. The data structure 200 may be used to determine how a particular signal should be altered to increase intelligibility as perceived by the listener, based upon determined accent characteristics. The data structure 200 comprises a participant field 204, a role field 208, an accent group field 212, and an adjustment parameters field 216. The participant field 204 maintains a list of at least some of the participants of a communication session. The participant field 204 may also include information about participants in past communication sessions such that it may be used again in future communication sessions.

The role field 208 stores the data related to each participant's role in a given communication session. The role field may be static, in the event that the communication session is a broadcast and a select number of participants are always speaking while all other participants are always listening. Alternatively, the role field 208 may be dynamically updated based upon the identification of who is currently speaking.

For example, as participant 1 continues to speak his/her role as shown in the role field 208 is a speaker. If no one else is speaking at the time, then all other participant's have a role of listener. When another participant begins to speak the role field 208 may be updated to reflect the new roles of each participant. The determination of each participant's role may be determined by monitoring signal activity from each participant's endpoint, and in the event that speech activity is detected, that particular participant has a role of speaker. However, more sophisticated mechanisms may be employed to determine who is speaking. Mechanisms including speech recognition functions or speaker identification functions may be employed. This may be particularly useful in the event that several participants are associated with a single endpoint. A determination of the identity of the speaker may be made at an endpoint and/or at the server 120. Thereafter, the role field 208 may be updated to reflect the same.

The accent group field 212 is used to store information about each participant's respective set of accent characteristics. In a preferred embodiment, a participant's accent characteristics are used to place each participant in a particular accent group. As can be seen in FIG. 2 participant 1 has been associated with accent group 3, whereas participant 2 has been associated with accent group 4. There may be up to k accent groups where typically k is greater than or equal to 1. Each accent group corresponds to and describes a selected accent and has a set of accent characteristics, each accent characteristic in the group corresponding to a value or range of values. The values are intended to account for typical variations in accent characteristics for a selected accent. Accent groups may be used to provide a quicker way of identifying and using a given participant's accent characteristics in order to determine how to treat a signal prior to transmission to the listener.

Referring now to FIG. 3, an accent space 300 will be described in accordance with at least some embodiments of the present invention. A number of accent groups 304a-k may exist within the accent space 300. A position of a given accent group may be based upon one or a number of characteristics of the given accent. In the event that n characteristics define a given accent group, then that accent group has a particular position in an n-dimensional accent space 300. For example, if accent groups 304a-k are defined by three characteristics (e.g., speech rate, content rate, and pitch), then the accent space 300 is a three dimensional space. Each group 304a-k may occupy a different location within that three-dimensional space. When a participant begins to speak, the accent recognition member 116 identifies where that speaker belongs in the three-dimensional space. Then the speaker can maintain that location in the accent space 300 or be assigned to the group 304 that they are closest to. Typically, accent groups 304 are placed within the accent space 300 by collecting a number of speech samples of different test subjects with different accents. The characteristics of these test subjects are analyzed and accent groups are defined based on that data. One accent group may correspond to an Eastern Australian accent, whereas another accent group may correspond to a Southern American accent. Of course the division of accent groups can be more defined based on the amount of data available. Specifically, one accent group may correspond to a Brooklyn accent whereas another accent group may correspond to a Manhattan accent. Along the same lines, an accent group may be more accurately defined such that the accent group represents a single participant's accent. Other methods of classifying accents are also well known in the art. For example, a publication by Hewlett-Packard Labs entitled, "Phoneme-less Hierarchical Accent Classification", which is herein incorporated by reference in its entirety, describes an alternative method of determining accent characteristics of a given participant in a communication session. In the publication, accent characteristics are determined by first analyzing a speech signal to determine the speaker's gender. Then based upon the determined gender of the speaker, the model applies a corresponding accent model (e.g., a first accent model for males and a second accent model for females). The speech signals are typically analyzed frame by frame and by comparing various frames of speech within the signal. An uttered speech signal is typically segmented into intervals. Then various speech features like signal energy, frequency, pitch, and the like are extracted from each frame using an algorithm implemented in Carnegie Mellon University's Sphinx 2.0 Speech Recognition System. Ultimately, the signal is classified based on a Gaussian Mixture Model (GMM). The proposed hierarchical accent classification has been shown to classify a speaker's accent characteristics with a greater amount of accuracy than previous systems. Additionally, other forms of artificial intelligence may be used to classify and/or recognize a participant's accent.

In accordance with alternative embodiments of the present invention, a speaker and/or listener is able to manually classify him/herself into an accent group. In other words, each participant may be asked where he/she was born, where he/she was raised, and where he/she lives. This information can be used to identify the accent characteristics of each participant. In still a further alternative, each participant may be given several choices of accent groups and then each participant will be asked to choose which accent group best describes him/her. Thus, each participant may become a temporary subscriber and the system substantially knows the accent of each participant without analyzing voice characteristics of each participant.

Once accent groups are defined and each participant has been at least positioned in the accent space 300, or more preferably assigned to an accent group 304a-k, then relative distances between participants can be calculated. As shown in FIG. 3, the relative distance between the third accent group 304c and the first accent group 304a is d(3–1). There is typically a distance between every accent group 304a-k, however, of particular interest is the distance between the group a speaker belongs to and the group a listener belongs to. This distance between the speaker's group and the listener's group is typically notated as d("speaker's group"–"listener's group") to illustrate the relationship between the speaker and the listener.

One way to determine the distance between the speaker's group and the listener's group is to determine the root mean square of the coordinates of each group within the accent space 300. For example, assume that the speaker belongs to third accent group 304c and one of the listeners belongs to the first accent group 301a. Further assume that the dimensional coordinates defining the position of the first group 304a within that accent group space 300 are x(1), y(1), and z(1), where x, y, and z, are coordinates of various accent characteristics that define the position of the accent group. The dimension coordinated defining the position of the third accent group 304c may be x(3), y(3), and z(3). In order to compute the distance d(3–1) between the speaker's group and the listener's group the following equation is applied.

$$d(3-1) = \sqrt{[x(3)-x(1)]^2 + [y(3)-y(1)]^2 + [z(3)-Z(1)]^2}$$

This equation may be applied for up to an n-dimensional space. Based upon the distance between the speaker's group and the listener's group the signal transmitted by the speaker may or may not be altered to increase the intelligibility as perceived by the listener. For example, in the event that the distance between the speaker's group and the listener's group is large, the signal may be slowed down/sped up significantly in order for the listener to comprehend the signal. Of course, both the speaker and listener may belong to the same accent group and therefore the distance between the listener's group and the speaker's group is zero. In this event the original signal may not be altered. Alternatively, the original signal may be sped up because the listener will be able to intelligibly understand what the speaker is saying at a quicker playback rate because he/she probably does not perceive the speaker to have an accent.

The distance between accents may be mapped to adjustment parameters 216 in the table shown in FIG. 2. A pointer could connect a determined distance to an adjustment of at least one property of the transmitted signal. In other words, a particular distance between accent groups may correspond to a particular rate adjustment, volume adjustment, and pitch adjustment for a given signal. This way once a distance has been determined between a speaker and a listener, the recognition member(s) 116 and/or 118 can reference the table 200 and possibly a pointer between the determined distance and a corresponding rate adjustment. The accent recognition member 116 can use the rate adjustment without needing to continually determine the distance or even make reference to the determined distance between the speaker and the listener's respective accent groups. This may be particularly useful in live conversations where additional processing steps are less than desirable due to the potential introduction of delays to the transmitted signal.

In accordance with an alternative embodiment of the present invention, a speaker may be identified by information embedded in the call header rather than having his/her accent analyzed. Based on caller identification information sent with a transmitted call, accent characteristics may be determined for both the sending and receiving parties. This is particularly easy to accomplish when the participant is a subscribing member and accent characteristics of the participant have been previously determined. In an alternative embodiment, the speaker's accent characteristics may be defined and determined by other information within the call header. For instance, the call header may contain the location that the call has originated from. The speech style recognition member 116 may determine that the speaker's accent characteristics are somewhat like accent characteristics of other people from the given location. In other words, the speech style recognition member 116 may assign the speaker to a German accent group if it is determined that the call originated from Germany. In the event that the caller's accent does not correspond to the location of origin, the speech style recognition member 116 can reassign the caller to a different accent group after it has had a chance to monitor actual accent characteristics of the speaker.

Utilizing information in the call header provides an efficient and easy way to determine potential differences between a speaker and listener's accent characteristics. Based on identifying the speaker and the listener, properties of a message sent from the speaker to the listener may be adjusted (e.g., playback speed increased or decreased, volume increase or decreased, pitch increased or decreased, and so on) before it is forwarded on to the receiving party. Additionally, if the header information provides a somewhat accurate portrayal of the speaker and listener's accent characteristics, the accent recognition member 116 may not have to monitor the call for very long. Thus, processing resources may be made available for other purposes. Additionally, if the accent characteristics of the speaker/listener are not accurately reflected by the identity of the participant and/or the location where the participant is calling from, then a participant may also be able to manually adjust which accent group they believe best fits them.

Figure 4:
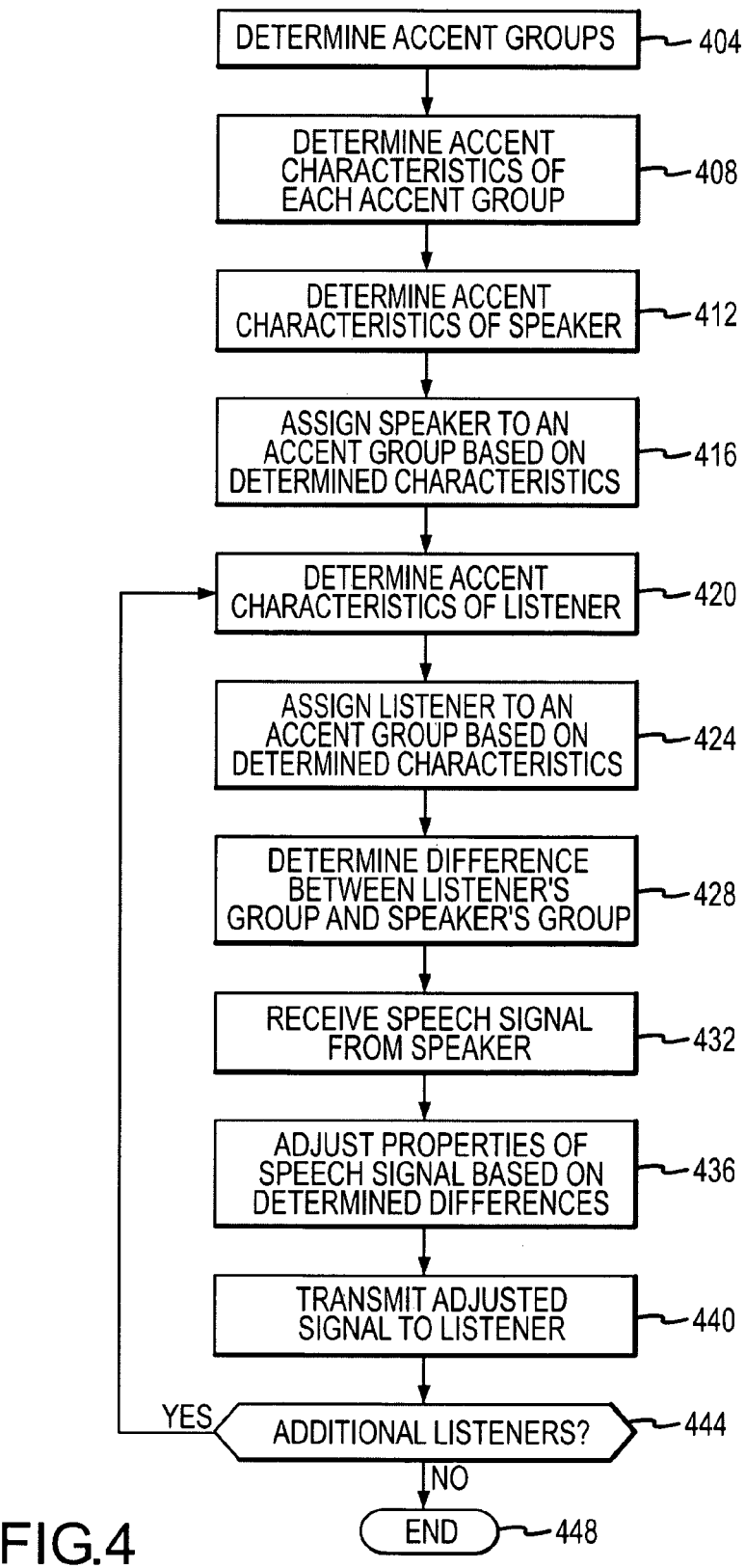
FIG. 4 is a flow chart depicting a method of augmenting a received signal based on accent classification in accordance with embodiments of the present invention.

Referring now to FIG. 4 a method of processing a signal so as to improve intelligibility of that signal as perceived by a recipient of that signal will be described in accordance with at least some embodiments of the present invention. Initially the method begins by determining accent groups (step 404). As noted above, accent groups may be located within an n-dimensional space, where n is the number of characteristics that define a given accent group, and where typically n is greater than or equal to 1. A single point within the accent space 300 typically defines an accent group. Then, speech qualities of each accent group are determined so that the accent group can be placed within the accent space 300 (step 408).

Once accent groups have been determined and defined, accent characteristics of a speaker are determined (step 412). Usually this step is performed during a communication session. As noted, accent characteristics of a speaker may be determined prior to the speaker engaging in a communication session, particularly where the speaker is a subscriber. For example, the recognition member(s) 116 and 118 residing on the endpoint 108 of a given person may continually monitor the accent characteristics of that person and continually update and determine that person's accent characteristics. Then, each time that person participates in a communication session, the recognition member(s) 116 and 118 can use historical data to place the participant in the accent space 300, instead of re-determining the accent characteristics of that person. Also, historical data relating to a potential participant's accent characteristics may be maintained in the database 128. This configuration conserves precious processing resources.

After the accent characteristics of the speaker have been determined, the speaker may be assigned to an accent group (step 416). The speaker may be first assigned a position within the accent space 300 and then placed in the group 304 that is closest to his/her position within the space 300. Alternatively, the accent space is subdivided into a plurality of subspaces, each subspace corresponding to an accent group. As the communication session continues, the recognition member(s) 116 and 118 may continually monitor the speaker's accent characteristics in order to more accurately attempt to place the speaker in an accent group 304. For example, when the communication session begins, the speech style recognition member 116 may place the speaker in the first accent group 304*a*, but after collecting more samples, the speech style recognition member 116 may re-assign the speaker to the fourth accent group 304*d*.

In step 420, the accent characteristics of the listener are determined. When the listener is a subscriber or a non-subscriber who is known to the system, the accent characteristics of the listener based on past conversations may be recovered from the database 128 or from the memory of the listener's respective endpoint. Alternatively, the listener may be prompted to say a few words before he/she begins participating in the communication session. A further alternative would be to have a default set of accent characteristics for the listener, then based on any word or phrase the listener says after the communication session begins, the listener preference recognition member 118 may determine and update the actual accent characteristics of the listener. In a broadcast, subscribers may be asked by an IVR, for example, where they are from and a rough determination of the listener's accent characteristics may be determined. After the accent characteristics of the listener have been determined in step 420, the listener is assigned to an accent group (step 424). As noted above, the listener may be re-assigned to other accent groups as the communication session progresses and a more accurate determination of the listener's accent characteristics can be determined.

In step 428, the differences, if any, between the listener's accent characteristics and the speaker's accent characteristics are determined. Usually, because both the listener and speaker are assigned to an accent group 304, the accent characteristics between the respective accent groups 304 are determined. The difference between the accent characteristics of the speaker and listener may be determined in accordance with at least some embodiments described above. Alternatively, other mechanisms may be employed when determining the difference between accent characteristics of a speaker and a listener. For instance, both the speaker and listener may be given point values based on their respective accent characteristics. The points between the listener and the speaker may be subtracted to determine how to adjust the properties of the speaker's original signal such that the listener can more intelligibly understand what the speaker is saying.

Thereafter, the speech signal uttered by the speaker is received (step 432). The recognition member 116 and/or 118 associated with either the speaker or listener's endpoint 108 may receive the signal. Also, the server 120 may receive the signal sent by the speaker. Regardless of where the speech signal is received, based on the determined differences between the accent characteristics of the speaker and listener, the properties of the signal may then be adjusted (step 436). The properties of the signal may be adjusted to increase the intelligibility of what the speaker is saying as perceived by the listener. They may also be adjusted to increase the efficiency of the communication session (e.g., be sped up to a rate that is still intelligible by the listener). As noted above, there exist many different ways to evaluate intelligibility as perceived by a listener.

After the properties of the signal have been adjusted, if such adjustment was determined necessary so as to increase the intelligibility of the signal as perceived by the listener, then the signal is transmitted to the listener (step 440). Then, in step 444, it is determined if there are any additional listeners in the communication session (e.g., the communication session is a broadcast and/or telephone/video conference). If there are additional listeners as determined in step 444, then the method returns to step 420 to determine the accent characteristics of the next listener in a manner similar to that described above. If there are no additional listeners as determined in step 444, then the method ends at step 448.

Figure 5:
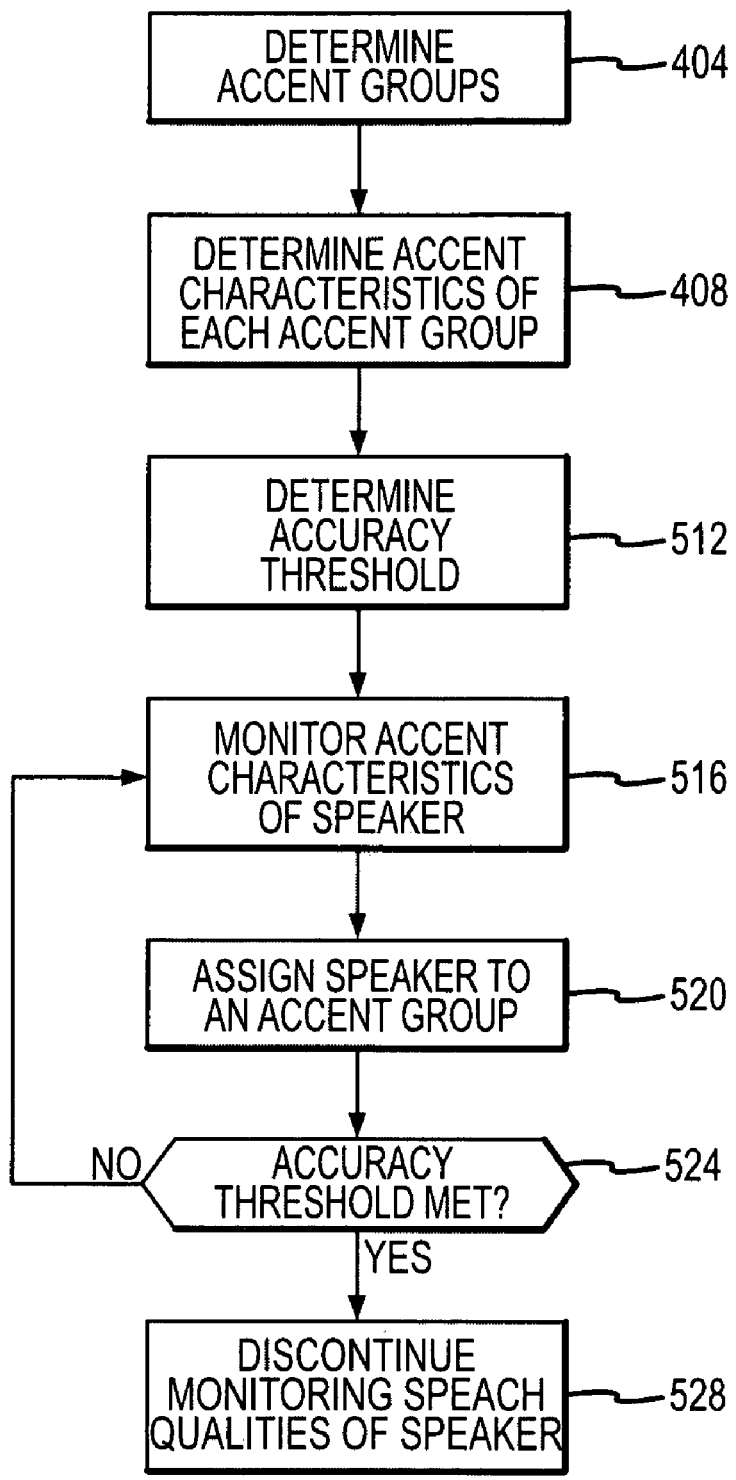
FIG. 5 is a flow chart depicting a method of automatically monitoring speech signals in accordance with embodiments of the present invention.

Referring now to FIG. 5, a method of automatically monitoring speech/listening style characteristics of a participant in a communication session will be described in accordance with at least some embodiments of the present invention. The method begins with determining accent groups in step 404, then determining accent characteristics of each accent group in step 408, each of which have been described above in accordance with at least some embodiments of the present invention.

After accent characteristics of each accent group have been determined, an accuracy threshold is determined in step 512. The accuracy threshold relates to how much monitoring of a speaker's accent characteristics will be necessary in order to adequately place the speaker within the accent space 300. The accuracy threshold may simply be a minimum amount of monitoring time required of the recognition member(s) 116 and/or 118 before such monitoring may be discontinued. The accuracy threshold may also correlate to a number of samples that are required of the recognition member(s) 116 and/or 118. Further, the accuracy threshold may be a required certainty with which the speaker is assigned to an accent group 304. In other words, if the speaker is placed within the accent space 300 and his/her location within that space is not suitably close enough to any accent group 304, then the speaker may be placed in one accent group 304 while the recognition member(s) 116 and/or 118 continue to monitor the accent characteristics of the speaker until he/she is located within a suitable distance of an accent group 304.

In step 516, the speech style recognition member 116 monitors the accent characteristics of the speaker. Then, in step 520, the speech style recognition member 116 assigns the speaker to an accent group. In step 524, it is determined if the accuracy threshold has been met (e.g., monitoring has occurred for the minimum amount of time, the required number of samples, the certainty of placement of the speaker in an accent group has been reached, etc.) If the accuracy threshold has not been met, then the method returns to step 516. However, if the accuracy threshold has been met, the speech style recognition member 116 may be allowed to discontinue monitoring the speaker's accent characteristics in step 528.

As can be appreciated by one of skill in the art, the recognition member(s) 116 and/or 118 may be monitoring the accent characteristics of more than one participant in the communication session. The accuracy threshold may apply to every participant of that session, or just a subset of the participants. Furthermore, even though the accuracy threshold of one participant has been met it is not necessarily true that the accuracy threshold of other participants has been met. The recognition member(s) 116 and/or 118 may discontinue monitoring the accent characteristics of one participant while it continues to monitor the accent characteristics of other participants.

In certain embodiments of the present invention, a user interface at the endpoint 108 and/or 112 may allow a user to adjust a received signal to compensate for potential errors in system analysis and/or a user's unique needs/desires. This additional level of user feedback may be used by the recognition member(s) 116 and/or 118 to more accurately determine other participant's accent characteristics during a later communication session.

Figure 6:
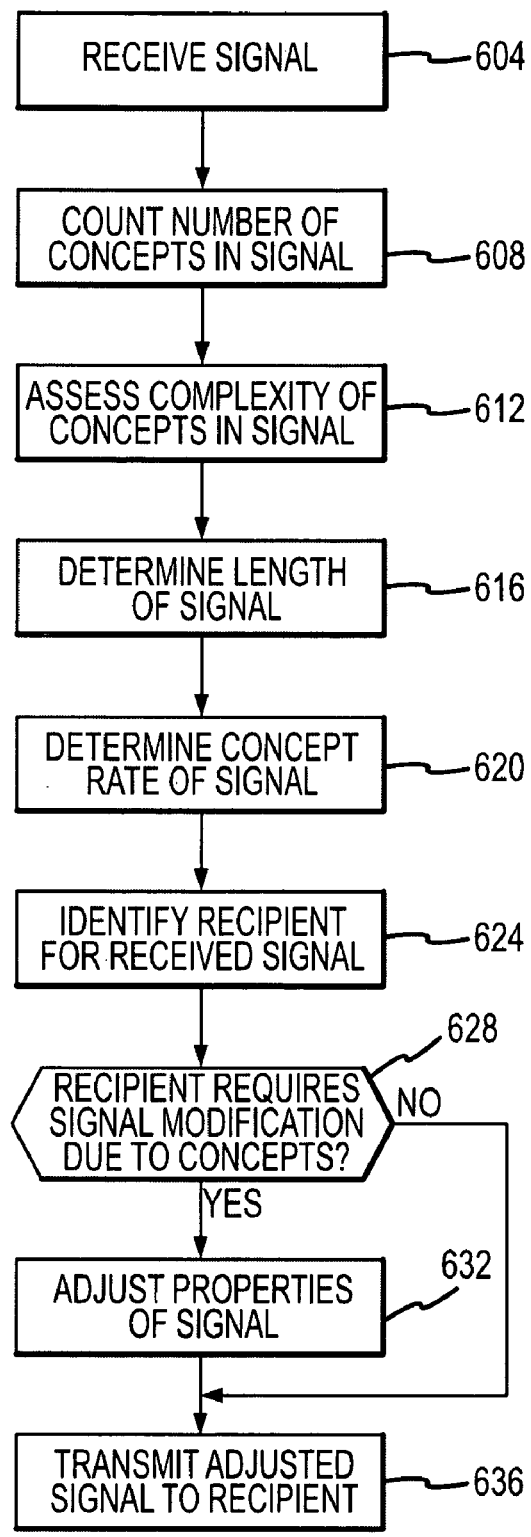
FIG. 6 is a flow chart depicting a method of processing a speech signal in accordance with embodiments of the present invention.

With reference to FIG. 6 a method of processing a speech signal will be described in accordance with at least some embodiments of the present invention. Initially, a signal is received at an endpoint 108 or a server 120 (step 604). The recognition member(s) 116 and/or 118 analyze the received signal and the number of concepts within the signal are counted (step 608). Thereafter, the recognition member(s) 116 and/or 118 assesses the complexity of the concepts within the signal (step 612). The combination of steps 608 and 612 is typically referred to as "semantic analysis." An explanation of semantic analysis can be found in *An Introduction to Latent Semantic Analysis* by Landauer et al., the contents of which are herein incorporated by this reference in their entirety. Essentially, semantic analysis can be used to determine the amount of concepts that are delivered by a particular message throughout the course of the message or by a portion of that message. Furthermore, semantic analysis can be used to determine the complexity of content delivered by a particular message throughout the course of the message or by a portion of that message.

After the number and complexity of concepts have been determined for the subject message, the length of the message is determined (step 616). Then based on the length of the message, the concept or content delivery rate of the received message is determined (step 620). In practice, the concept rate may simply be determined by dividing the number of concepts by the length of the message. However, certain portions of the message may have more concepts than another portion of the same message. Thus, the concept rate of various portions of the message may be determined, where more concept dense portions are separated from concept sparse portions. Therefore, when the message is adjusted to account for concept density, the portions having more concepts per unit time may be slowed down more than other portions have fewer concepts per unit time.

Once the concept rate for the signal, or portions of the signal, has been determined, the recipient of the received signal is identified (step 624). There exist a number of ways to identify a potential recipient for a particular message. One process would include searching caller identification information or the like to identify the potential recipient.

In step 628, it is determined if the recipient has cognitive needs or otherwise might require a modification of the message prior to its transmission to the recipient. Again, there are a number of methods that may be employed in order to determine if a participant has cognitive needs. For example, a participant may have preloaded his/her cognitive disabilities or corresponding needs into the endpoint that he/she is using. Thus, when the endpoint of the participant having those needs is connected to a server 120 or the like, the server 120 is operable to retrieve and review the needs of the participant. Alternatively, information for any participant having cognitive needs may be stored in the database 128 such that it can be accessed whenever that participant attempts to make a phone call. Still further in the alternative, the user's needs may be supplemented with regular caller identification information. Another alternative is to enable endpoints to share a user's needs with another endpoint during a Session Initiation Protocol (SIP) handshake. As can be appreciated by one of skill in the art, additional methods may be exploited in order to determine whether a user has cognitive needs or not.

In the event that the recipient has been identified as having some type of cognitive needs, one or more properties of the received signal are adjusted to compensate for the recipient's needs (step 632). As noted above, certain portions of the signal ("message") may be denser with content than other portions of the same signal. Therefore, the adjustment of the signal may be based upon the density of content for a particular portion of the signal. Alternatively, based on the average amount of content delivered, the signal properties may be adjusted evenly for the entire signal. The signal is altered in order to provide a more intelligible message to recipient, resulting in a better experience for participants with cognitive disabilities. Additionally, other methods described herein may be employed if it is determined that the speaker has an accent as perceived by the recipient. In such an event, the signal may be further adjusted to compensate for the perceived accent.

The adjusted signal is then transmitted to the recipient (step 636). However, if it is determined in step 628 that the recipient has not cognitive disabilities, then the signal may not be adjusted but rather is simply transmitted to the recipient in step 636. As noted above, even though the recipient does not have any cognitive disabilities the signal may be adjusted to compensate for a difference in accents between the speaker and the listener.

It can also be appreciated by one of skill in the art that at least some embodiments of the present invention may be applied to video media in addition to being applicable to audio media. For example, the accent characteristics of one participant in a video communication session may be monitored, along with other motion characteristics that may further help to determine intelligibility as perceived by a recipient of the video signal. If based on the accent characteristics of the speaker it is determined that the video signal needs to be adjusted along with the corresponding audio signal, suitable adjustment can be performed on both signals in order to synchronize the lips of the speaker with the words uttered by the speaker. Furthermore, in applications where video conferencing is being used between individuals speaking in sign language, accent characteristics may also include how fast the speaker (i.e., the person signing) is actually moving. If the signing party is moving very quickly, and it is determined that the listener cannot intelligibly understand what the speaker is attempting to say based on the listener's respective accent characteristics, the video may be slowed down such that the receiving party can intelligibly understand what the speaker is saying. Even if sign language is not being used, various motions of a speaker may be monitored to determine if the video signal and/or corresponding audio signal needs to be adjusted in order for the listener to intelligibly understand what the speaker is trying to convey.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of increasing the intelligibility of a communication session between a first participant and a second participant, comprising:
   receiving a voice signal from the first participant;
   determining, by a communication device, at least one speech style characteristic of the first participant;
   assigning, based upon determining the at least one speech style characteristic of the first participant, the first participant to a first accent group having a first set of speech and listening style characteristics;
   determining at least one listening style characteristic of the second participant;
   assigning, based upon determining the at least one listening style characteristic of the second participant, the second participant to a second accent group having a second set of speech and listening style characteristics;
   determining a difference between the first set of speech and listening style characteristics and the second set of speech and listening style characteristics; and
   based on the determined difference, performing at least one of the following:
      (i) adjusting at least one property of at least one portion of the voice signal and transmitting the adjusted voice signal to the second participant; and
      (ii) maintaining original properties of at least a portion of the voice signal and transmitting the voice signal to the second participant.

2. The method of claim 1, wherein at least one of the speech style characteristic and listening style characteristic comprise an accent characteristic.

3. The method of claim 2, further comprising:
   the first accent group having a first set of accent characteristics based upon determining the at least one accent characteristic of the first participant;
   the second accent group having a second set of accent characteristics based upon determining the at least one accent characteristic of the second participant; and
   wherein the determining comprises calculating a difference between at least a portion of the first set of accent characteristics of the first accent group and at least a portion of the second set of accent characteristics of the second accent group.

4. The method of claim 1, wherein the determining a difference comprises:
   determining dimensional coordinates of at least a portion of the first set of speech and listening style characteristics;
   determining dimensional coordinates of at least a portion of the second set of accent speech and listening style characteristics; and
   computing the root means square between the dimensional coordinates of the at least a portion of the first set of speech and listening style characteristics and the dimensional coordinates of the at least a portion of the second set of speech and listening style characteristics.

5. The method of claim 1, wherein the determining at least one speech style characteristic of the first participant comprises determining the identity of the first participant.

6. The method of claim 1, wherein the at least one speech style characteristic of the first participant comprises at least one of pitch, volume, timbre, tone, speech rate, and content rate.

7. The method of claim 1, wherein a property of at least a portion of the voice signal comprises at least one of pitch, tone, volume, and playback rate.

8. The method of claim 1, further comprising:
   determining a monitoring threshold;
   determining whether the monitoring threshold has been exceeded; and
   performing one of the following:
      (i) in the event that the monitoring threshold has been exceeded, discontinuing the determining at least one characteristic of the first and second participant; and
      (ii) in the event that the monitoring threshold has not yet been exceeded, continuing the determining at least one characteristic of the first and second participant.

9. The method of claim 8, wherein the monitoring threshold comprises a predetermined amount of time.

10. The method of claim 8, wherein the monitoring threshold comprises a predetermined amount of accuracy.

11. The method of claim 1, wherein at least one of the speech style characteristic and listening style characteristic are classified by the rate with which the received voice signal is spoken, as measured in number of phonemes per unit time.

12. The method of claim 1, wherein at least one of the speech style characteristic and listening style characteristic are classified by the rate with which the speech is spoken, as measured in number and/or complexity of concepts per unit time.

13. The method of claim 1, further comprising:
   determining an identity of at least one of the first and second participant from caller identification information; and
   based on the determined identity, determining a speech style characteristic of the first and/or determining a listening style characteristic of the second participant.

14. A computer readable medium comprising executable instructions stored thereon operable, when executed, to perform the method of claim 1.

15. A device for use in a communication session between at least a first and second participant, comprising:
   an input operable to receive a signal from the first participant;
   an recognition member operable to determine at least one speech style characteristic of the first participant, assign the first participant to a first accent group having a first set of speech and listening style characteristics associated therewith, determine at least one listening style characteristic of the second participant, assign the second participant to a second accent group having a second set of speech and listening style characteristics associated therewith, determine a difference between the first set of speech and listening style characteristics and the second set of speech and listening style characteristics, and further operable to adjust at least one property of at least a portion of the signal based on the determined difference; and
   an output operable to transmit the adjusted signal to the second participant.

16. The device of claim 15, wherein at least one of the speech style characteristic and listening style characteristic comprise an accent characteristic.

17. The device of claim 16, wherein the first accent group has a first set of accent characteristics, wherein the second accent group has a second set of accent characteristics, and wherein the recognition member is further operable, based upon determining the at least one accent characteristic of the first participant, to calculate a difference between at least a portion of the first set of accent characteristics of the first accent group and at least a portion of the second set of accent characteristics of the second accent group.

18. The device of claim 15, wherein the recognition member is further operable to determine dimensional coordinates of at least a portion of the first set of speech and listening style characteristics, determine dimensional coordinates of at least a portion of the second set of speech and listening style characteristics, compute the root means square between the dimensional coordinates of the at least a portion of the first set of speech and listening style characteristics and the dimensional coordinates of the at least a portion of the second set of speech and listening style characteristics.

19. The device of claim 15, wherein the recognition member determines the identity of the first participant as a part of determining at least one speech style characteristic of the first participant.

20. The device of claim 15, wherein the at least one speech style characteristic of the first participant comprises at least one of pitch, volume, timbre, tone, speech rate, and content rate.

21. The device of claim 15, wherein a property of at least a portion of the signal comprises at least one of pitch, tone, volume, and playback rate.

22. The device of claim 15, wherein the recognition member is further operable to determine a monitoring threshold, and in the event that the monitoring threshold has been exceeded, discontinue determining at least one accent characteristic of the first and second participant.

23. The device of claim 15, wherein the monitoring threshold comprises a predetermined amount of time.

24. The device of claim 15, wherein the monitoring threshold comprises a predetermined amount of accuracy.

25. A communications method, comprising:
   in an interaction between at least first and second communication device, the first and second communication devices corresponding to first and second participants, receiving a voice signal from the first communication device;
   determining, by at least one of the first communication device or the second communication device, at least one speech style characteristic of the first participant;
   assigning the first participant to a first accent group having a first set of speech and listening style characteristics associated therewith;
   determining at least one listening style characteristic of the second participant;
   assigning the second participant to a second accent group having a second set of speech and listening style characteristics associated therewith;
   determining a difference between the first set of speech and listening style characteristics and the second set of speech and listening style;
   adjusting at least one property of at least a portion of the signal to compensate for the difference; and
   thereafter providing the adjusted signal to the second participant.

26. The method of claim 25, further comprising:
   determining an identity of the second participant from caller identification information; and
   based on the determined identity, determining the comprehension level of the second participant.

27. The method of claim 25, further comprising:
   determining a location of at least one of the first and second communication device; and
   based on the determined location, determining an accent of at least one of the first and second participant.

28. The method of claim 25, wherein the at least one adjusted property comprises at least one of pitch, tone, volume, and playback rate.

29. The method of claim 25, further comprising:
   identifying the number of concepts within the received voice signal;
   assessing the complexity of at least one of the number of concepts within the received voice signal; and
   determining a concept rate of the received voice signal.

30. A computer readable medium comprising executable instructions stored thereon operable, when executed, to perform the method of claim 25.

* * * * *

UNITED STATES PATENT AND TRADEMARK OFFICE
CERTIFICATE OF CORRECTION

PATENT NO.        : 7,653,543 B1
APPLICATION NO. : 11/388694
DATED             : January 26, 2010
INVENTOR(S)       : Blair et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 904 days.

Signed and Sealed this

Twenty-third Day of November, 2010

David J. Kappos
*Director of the United States Patent and Trademark Office*